UNITED STATES PATENT OFFICE.

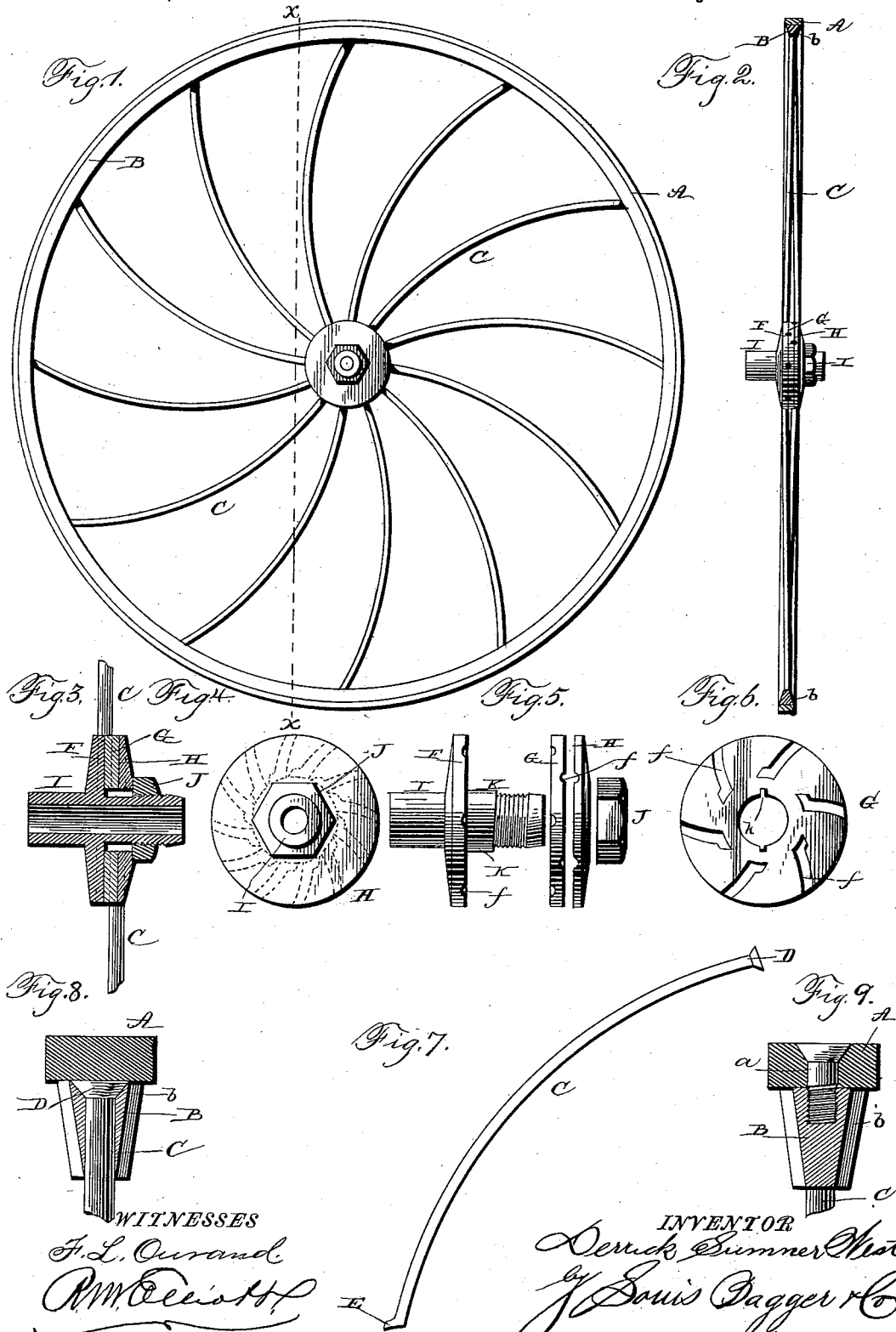

DERRICK SUMNER WEST, OF GREAT FALLS, MONTANA TERRITORY.

WHEEL FOR VEHICLES.

SPECIFICATION forming part of Letters Patent No. 407,266, dated July 16, 1889.

Application filed April 10, 1889. Serial No. 306,694. (No model.)

*To all whom it may concern:*

Be it known that I, DERRICK SUMNER WEST, a citizen of the United States, and a resident of Great Falls, in the county of Cascade and Territory of Montana, have invented certain new and useful Improvements in Wheels for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved wheel. Fig. 2 is a cross-section of the same on line $x\,x$ in Fig. 1, looking in the direction of the hub. Fig. 3 is a sectional view taken through the axis of the hub. Fig. 4 is a side view of the hub. Fig. 5 is a side view at right angles to the view shown in Fig. 4, illustrating the several parts which constitute the complete hub separated from one another and in their relative positions to be put together. Fig. 6 is a face view of the central hub disk or plate. Fig. 7 is a detail view of one of the spokes. Fig. 8 is a detail sectional view illustrating the method of fastening the spokes in the fellies; and Fig. 9 is a sectional view through the fellies and tire, illustrating the manner of fastening the tire.

Like letters of reference denote corresponding parts in all the figures.

This invention has relation to metallic wheels for buggies and other vehicles adapted to their use of that class in which curved spokes of steel or other suitable metal are employed; and my improvement consists in the peculiar construction and combination of part of a wheel of that type, as will be hereinafter more fully described and claimed.

Reference being had to the accompanying drawings, the letter A designates the tire, and B the fellies, which compose the rim or circumference of the wheel. The spokes (shown at C) are preferably made of steel curved and terminating at their outer ends in the enlarged heads D and at their inner ends in elbows E, adapted to fit into curved recesses $f$ in the hub-plates.

The hub is composed of three circular disks or plates F, G, and H, fastened upon a central sleeve or thimble I and locked together, so as to clamp the inner ends of the spokes between them, by means of the nut J and the keys K. These disks are provided with equidistant recesses $f$, of such size, location, and shape as to fit the inner bent ends or elbows E of the curved spokes in such a manner that when the spokes are placed in position in their respective recesses and the plates are clamped together by means of the nut J being screwed up on the threaded end of thimble I against the outermost disk H the inner ends of the spokes will be held firmly in position between said disks or plates, as illustrated more clearly in Fig. 3, the spokes being clamped or held alternately between the inner disk F and central disk G and said disk G and the outer disk H. When in this position, the bent inner ends or elbows E will effectually prevent the spokes from slipping or springing out endwise from their recesses $f$ in the hub.

The recessed disks F, G, and H are prevented from turning not only by the nut J and the inner ends of the spokes, which, fitting in their respective recesses, operate as keys in respect to the recessed disks, but as an additional safeguard I employ keys K, which are inserted into registering notches $k$ in the inner bores or apertures of the disks, thereby firmly locking the several plates together, so as to form a solid and substantial hub.

The outer headed ends D of the curved spokes are inserted into countersunk recesses $b$ in the fellies B, as shown in Fig. 8, the enlarged heads D fitting into said countersunk recesses and being covered by the tire A, which is fastened to the fellies by means of screws $a$, screwed into the fellies between the spokes and having heads which fit into correspondingly-shaped countersunk recesses in the tires, as will be seen more clearly by reference to Fig. 9.

From the foregoing description, taken in connection with the drawings, it will be seen that my improved wheel combines strength, elasticity, and durability in an eminent degree, there being no possibility of the spokes becoming accidentally detached from the hub or rim, even if the wheel should be subjected to the roughest usage. At the same time any one or all of the spokes may readily be removed whenever desired for repair or substitution of a new one, and the spokes may be made of round metal, or flat, oval, or of any other desired shape in cross-section, as may be desired.

Having thus described my invention, I claim and desire to secure by Letters Patent of the United States—

In a wheel for vehicles, the combination of the countersunk fellies, curved spokes having enlarged heads at their outer ends and bent at their inner ends to form right-angled elbows, the hub comprising a central threaded sleeve or thimble, a central disk having recesses alternating with one another on both sides, and two side disks having recesses on their inner sides registering, respectively, with the recesses on opposite sides of the outer disks or side disks, keys for locking said disks together, and the nut working upon the threaded end of the hub-thimble and adapted to force the several disks together laterally, substantially in the manner and for the purpose herein shown and set forth.

In testimony that I claim the foregoing as my own I have hereunto affixed my signature in presence of two witnesses.

DERRICK SUMNER WEST.

Witnesses:
FRANK FOYE SHUR,
WILLIAM S. WETZEL.